United States Patent
Lum et al.

(10) Patent No.: US 8,519,444 B2
(45) Date of Patent: Aug. 27, 2013

(54) MODIFIED DESIGN RULES TO IMPROVE DEVICE PERFORMANCE

(75) Inventors: Annie Lum, San Jose, CA (US); Derek C. Tao, Fremont, CA (US); Cheng Hung Lee, Hsinchu (TW); Chung-Ji Lu, Fongyuan (TW); Hong-Chen Cheng, Hsinchu (TW); Vineet Kumar Agrawal, Santa Clara, CA (US); Keun-Young Kim, Campbell, CA (US); Pyong Yun Cho, Fremont, CA (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 139 days.

(21) Appl. No.: 12/879,447

(22) Filed: Sep. 10, 2010

(65) Prior Publication Data

US 2012/0061764 A1 Mar. 15, 2012

(51) Int. Cl.
*H01L 27/118* (2006.01)

(52) U.S. Cl.
USPC .............. 257/202; 257/401; 257/E27.108

(58) Field of Classification Search
CPC .......................................... H01L 21/823828
USPC ............... 257/201, 202, E27.108, 203, 401
See application file for complete search history.

(56) References Cited

U.S. PATENT DOCUMENTS

| | | | | |
|---|---|---|---|---|
| 7,432,180 B2 * | 10/2008 | Uchino et al. | ............... | 438/581 |
| 2005/0205849 A1 * | 9/2005 | Whiteford et al. | ............ | 252/500 |
| 2005/0280031 A1 * | 12/2005 | Yano | ............................. | 257/202 |
| 2007/0210391 A1 * | 9/2007 | Becker et al. | .................. | 257/390 |
| 2008/0006951 A1 * | 1/2008 | Hebert et al. | .................. | 257/786 |
| 2008/0224176 A1 * | 9/2008 | Nakanishi et al. | ............ | 257/202 |
| 2009/0134467 A1 * | 5/2009 | Ishida et al. | ................... | 257/368 |
| 2010/0058267 A1 | 3/2010 | Lu et al. | | |

FOREIGN PATENT DOCUMENTS

CN 1710711 12/2005

OTHER PUBLICATIONS

Office Action dated Dec. 20, 2013 from corresponding application No. CN201110274859.8.

* cited by examiner

*Primary Examiner* — Jerome Jackson, Jr.
*Assistant Examiner* — Paul Budd
(74) *Attorney, Agent, or Firm* — Lowe Hauptman & Ham, LLP

(57) ABSTRACT

The layouts, device structures, and methods described above utilize dummy devices to extend the diffusion regions of edge structures and/or non-allowed structures to the dummy device. Such extension of diffusion regions resolves or reduces LOD and edge effect issues. In addition, treating the gate structure of a dummy device next to an edge device also allows only one dummy structure to be added next to the dummy device and saves the real estate on the semiconductor chip. The dummy devices are deactivated and their performance is not important. Therefore, utilizing dummy devices to extend the diffusion regions of edge structures and/or non-allowed structures according to design rules allows the resolution or reduction or LOD and edge effect issues without the penalty of yield reduction or increase in layout areas.

19 Claims, 18 Drawing Sheets

MODIFIED DESIGN RULES TO IMPROVE DEVICE PERFORMANCE

FIELD

This application relates to design rules and, more particularly, to design rules of dummy devices.

BACKGROUND

The semiconductor integrated circuit (IC) industry has experienced rapid growth. Technological advances in IC processing and design have produced generations of ICs where each generation has smaller and more complex circuits than the previous one. As integrated circuit manufacturing technology has developed, and VLSI (very large scale integration) has increased the density of features on a wafer, the process of designing the circuits becomes separated from the process of manufacturing them.

In recent years, it has been realized that it is important, at the design stage, to take into account the particularities of the processes that will be used to manufacture the integrated circuits. More particularly, it is desirable to design the integrated circuits so that the various processes involved in manufacturing the devices are optimized, while at the same time ensuring low cost, acceptable product quality, reliability, and safety, etc. This is referred to as applying "design for manufacture" (DFM) techniques or principles. When applying DFM techniques in designing semiconductor integrated circuits, the designer is concerned about how the various aspects of the circuit design affect the yield. Different factors can introduce yield loss and/or device performance. People in charge of manufacturing the ICs could specify design rules that integrated circuit designers must comply with in order to produce a useable final product with good yield. It is within this context the following disclosure arises.

BRIEF DESCRIPTION OF THE DRAWINGS

The present disclosure will be readily understood by the following detailed description in conjunction with the accompanying drawings, and like reference numerals designate like structural elements.

DETAILED DESCRIPTION OF THE EXEMPLARY EMBODIMENTS

Figure 1A:
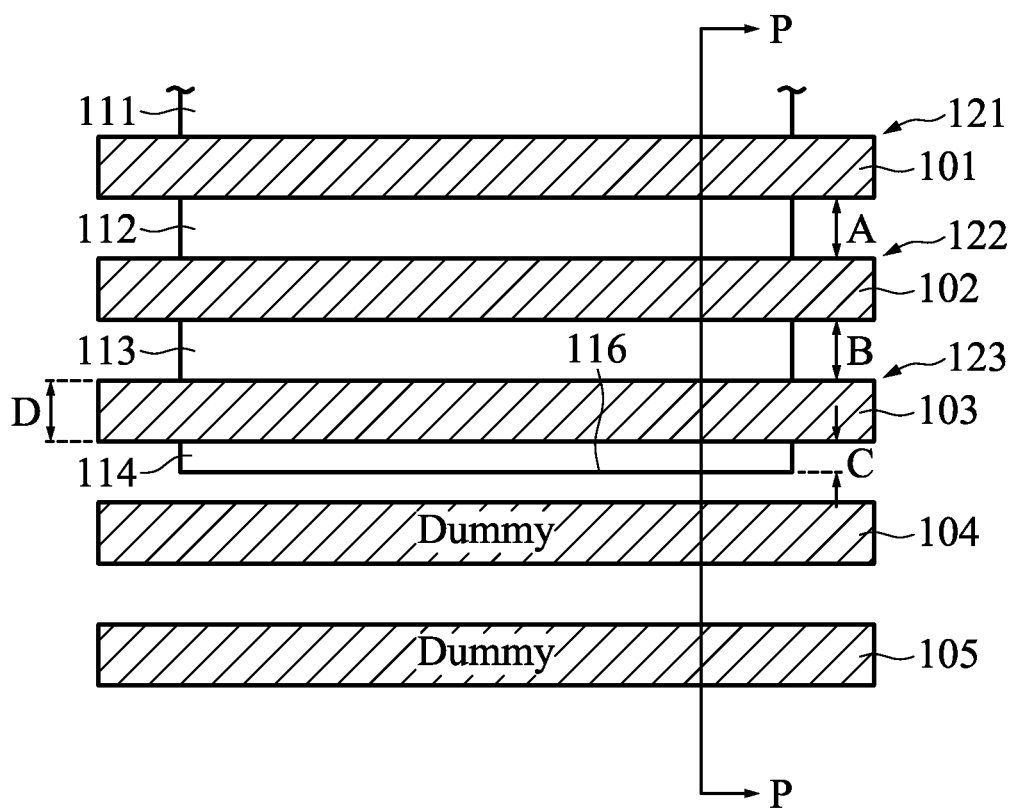
FIG. 1A shows a top layout view of a device area 100, in accordance with some embodiments.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As mentioned above, people in charge of manufacturing the ICs could specify design rules that integrated circuit designers must comply with in order to produce a useable final product with good yield. One of such design rules is related to gate structures. FIG. 1A shows a top layout view of a device area 100, in accordance with some embodiments. FIG. 1A shows a number of gate structures, 101, 102, 103, 104, and 105, placed above a number of diffusion regions, 111 (not completely shown), 112, 113, and 114. After manufacturing, the gate structures are at least made of a gate layer(s) over a gate dielectric layer(s), in accordance with some embodiments. The gate layer can be made of polysilicon. Even for replacement gates, the gate layer is first deposited with polysilicon, which is later removed and replaced with another type of gate material(s). For simplicity of discussion, we will call the gate structures, 101, 102, 103, 104, and 105, of FIG. 1A polysilicon lines.

Diffusion region 111 is at the edge of the drawing and is not completely shown. The widths of the diffusion regions (or implant regions), 112, 113, and 114, are "A", "B", and "C" respectively. In some embodiments, the space between two neighboring polysilicon lines, such as between 101 and 102, between 102 and 103, between 103 and 104, and between 104 and 105, are equal. In some embodiments, the width of polysilicon lines 101, 102, 103, 104, 105, is equal to be "D". Gate structures 101, 102, and 103 form transistors, 121, 122, and 123 with diffusion regions 111, 112, 113, and 114.

Figure 1B:
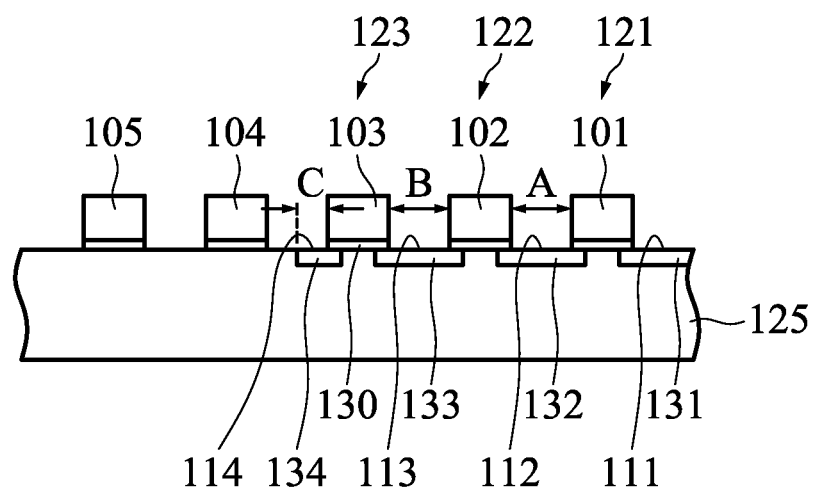
FIG. 1B shows a cross-sectional and schematic view of the device area of FIG. 1A after the layout is used to manufacture devices, in accordance with some embodiments.

FIG. 1B shows a cross-sectional and schematic view of the device area 100 cut along PP line in FIG. 1A after the layout is used to manufacture devices, in accordance with some embodiments. FIG. 1B shows cross sections of polysilicon lines, 101, 102, 103, 104, and 105, with a dielectric layer 130 underneath. The diffusion regions 111, 112, 113, 114 define regions that are implanted with N-type or P-type dopants, which can be thermally treated afterwards and diffuse to (and extend to) areas under portions of polysilicon lines 101, 102, and 103 to become actual diffusion regions 131, 132, 133, and 134. The type of dopants used for implant in regions 111, 112, 113, 114 depends on the type of devices 121, 122, and 123. If devices (or transistors) 121, 122, and 123 are NMOS (or N-type metal-oxide-semiconductor), the dopants implanted in regions 111, 112, 113, 114 are N-type dopants. Similarly, if the devices are PMOS (P-type MOS), the dopants are P-type. The gate dielectric layer 130 can be made of a single dielectric material or be made of a composite layer (more than one layer) with more than one dielectric material.

Figure 1C:
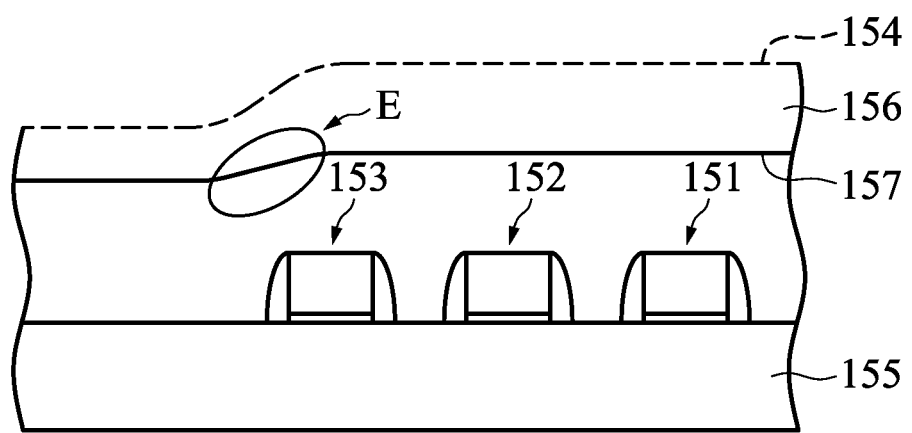
FIG. 1C shows a cross section of a device region with an edge gate structure, in accordance with some embodiments.

In FIGS. 1A and 1B, polysilicon lines (or structures) 104 and 105 are dummy structures, which are placed next to polysilicon structure 103 according to a design rule. The polysilicon structure 103 defines the gate of transistor 123 and is the last (or end) transistor gate structure in a row of transistors, 101, 102, and 103. To ensure good process uniformity, the design rule specifies that two dummy polysilicon structures, such as structure 104 and 105, need to be placed next to polysilicon structure 103. Without the two dummy polysilicon structures, the edge polysilicon structure 103 could suffer patterning and etching non-uniformity due to edge effects. Further, pre-metal dielectric (PMD) layer near the end polysilicon structure could also suffer from local non-uniformity issue. For example, FIG. 1C shows a substrate 155 with 3 gate structures 151, 152, and 153 covered by a PMD layer 156, with the edge of the PMD layer shown by dotted line 154. After chemical-mechanical planarization (CMP) (shown by edge line 157), there is a local slope near edge gate structure 153 in region "E", which could be a result of local stress experienced by the polishing pad due to the end of polysilicon structures. The slope in region E can make contact patterning more challenging. For advanced technologies, such as 65 nm, 40 nm, 28 nm, 20 nm, or below, the contact size become smaller and smaller. If a contact needs to be made on or near region E, the slope could make patterning of contact problematic and could affect the yield of contacts. Therefore, the design rule specifies that two extra dummy polysilicon structures be added next to the edge structure to overcome (or prevent) process uniformity issues.

According to the design rule, two dummy polysilicon structures 104 and 105 are added next to structure 103. Transistor 123 is at the edge of a number of transistors, including structures 121, 122, and 123. If the spacing between polysilicon lines, 101, 102, 103, and 104, is the same, the length of diffusion "C" would be shorter than length of diffusion "A" and "B", as shown in FIGS. 1A and 1B. The shorter length of diffusion (LOD) and additional diffusion edge effect along edge 116 of diffusion region 114, compared to diffusion regions such as 111, 112 and 113, could make transistor 123 behave less well than expected, in comparison to transistors 101, 102 and 103. Even if the spacing between lines, 101, 102, 103, and 104, is not the same and "C" is about the same as either "A" or "B", the diffusion edge issue related to edge 116 still exists.

Figure 1D:
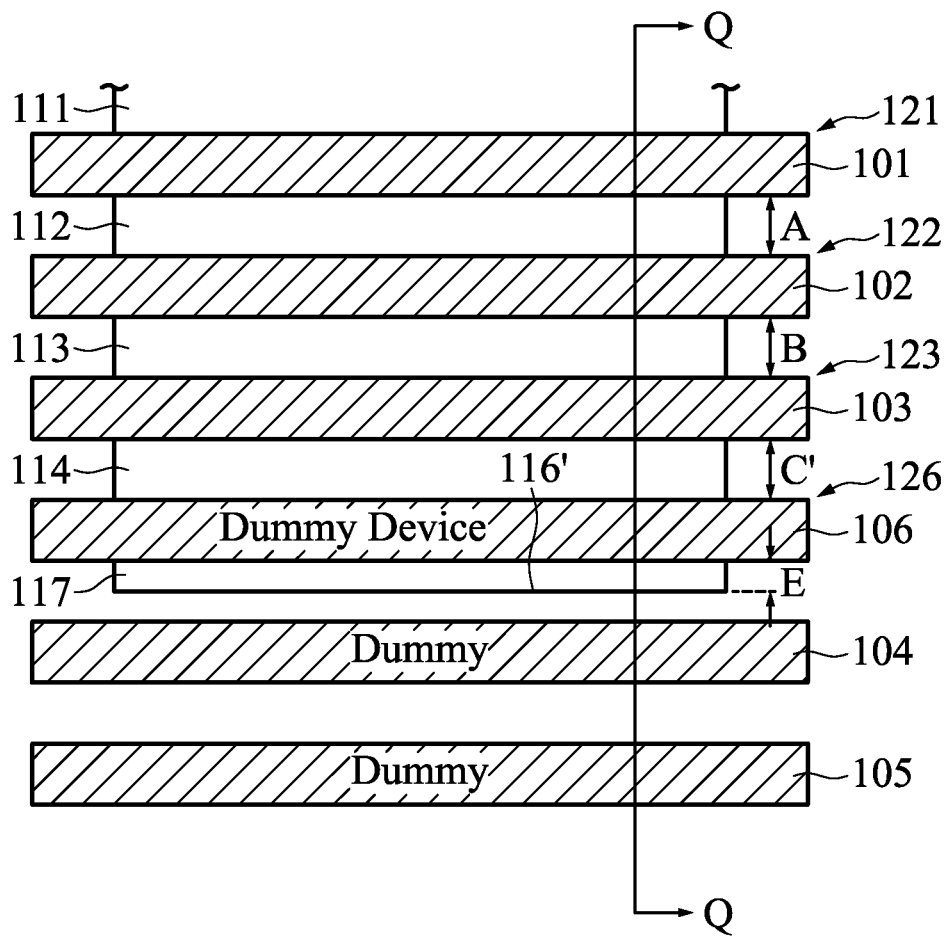
FIGS. 1D-1G show different embodiments of design layout and device structures with a dummy device next to an edge device.
Figure 1E:
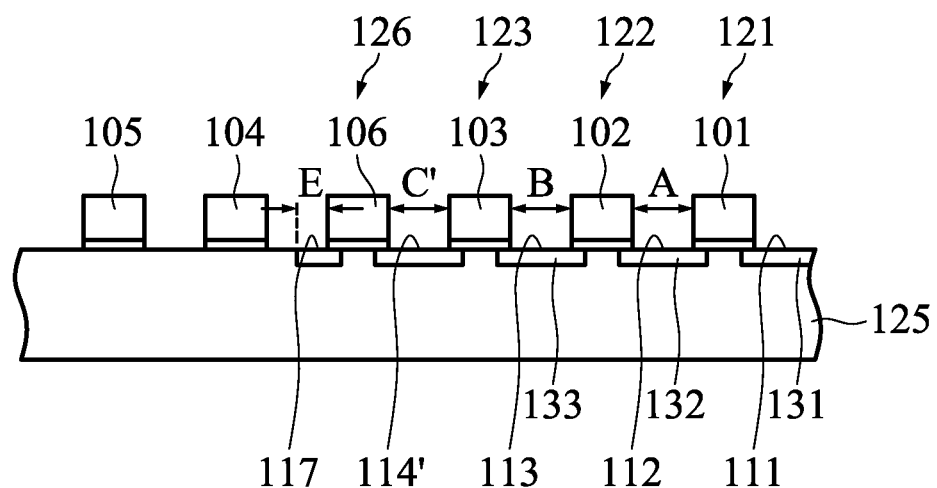

To resolve the LOD and edge effect issues related to diffusion region 114 (or region 134) of transistor 123, a dummy device 126 can be inserted between device 123 and dummy gate structure (or polysilicon line) 104, as shown in FIGS. 1D and 1E in accordance with some embodiments. FIG. 1E shows a cross-sectional view of structures of FIG. 1D after the layout of FIG. 1D is used to create device structures, in accordance with some embodiment. The dummy device 126 includes a gate polysilicon structure 106 and a diffusion region 114', which is shared with transistor 123, and a diffusion region 117 with an edge 116'. The diffusion region 114 of FIGS. 1A and 1B with a length "C" is extended to diffusion region 114' with a length "C'", which does not have an edge 116. In some embodiments, the diffusion region 114' has a length "C'" equal to or greater than length "A" or "B". Since transistor 126 is a dummy device, the shorter diffusion length "E" of diffusion region 117 and the additional edge (with edge effect) 116' would not affect overall device performance or yield of the chip. The dummy transistor 126 needs to be inactivated. If transistor 126 is an NMOS, the gate of transistor 126 is connected to Vss to deactivate the device. If transistor 126 is a PMOS, the gate of transistor 126 is connected to Vdd to deactivate the device.

By inserting a dummy transistor (or device) 126, the LOD and edge effect issues related to transistor 123 are resolved. However, transistor 126 introduces an extra polysilicon structure 106 and a region between polysilicon structures 106 and 104, which includes an extra diffusion region 117. The polysilicon structure 106 and the region between polysilicon structures 106 and 104 take extra space (or real estate) on the substrate.

Figure 1F:
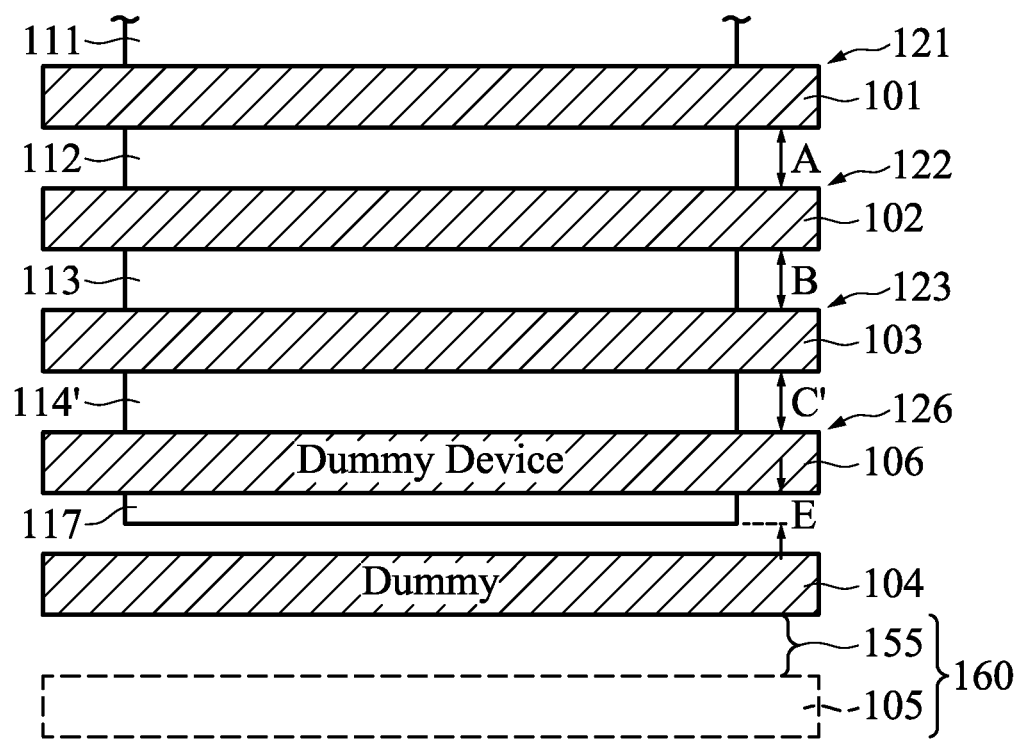

As mentioned above, transistor 126 is a dummy device and its performance is not important. Therefore, the polysilicon structure 106 could be treated as a dummy polysilicon. As a result, only one additional polysilicon structure needs to be placed next to dummy polysilicon structure 106. FIG. 1F shows the dummy polysilicon structure 105 being removed, in accordance with some embodiments, and only dummy polysilicon structure 104 remains. FIG. 1F shows that the surface area 160 previously occupied by polysilicon structure 105 and the space (region 155) between polysilicon structures 104 and 105 are freed up (or saved).

Figure 1G:
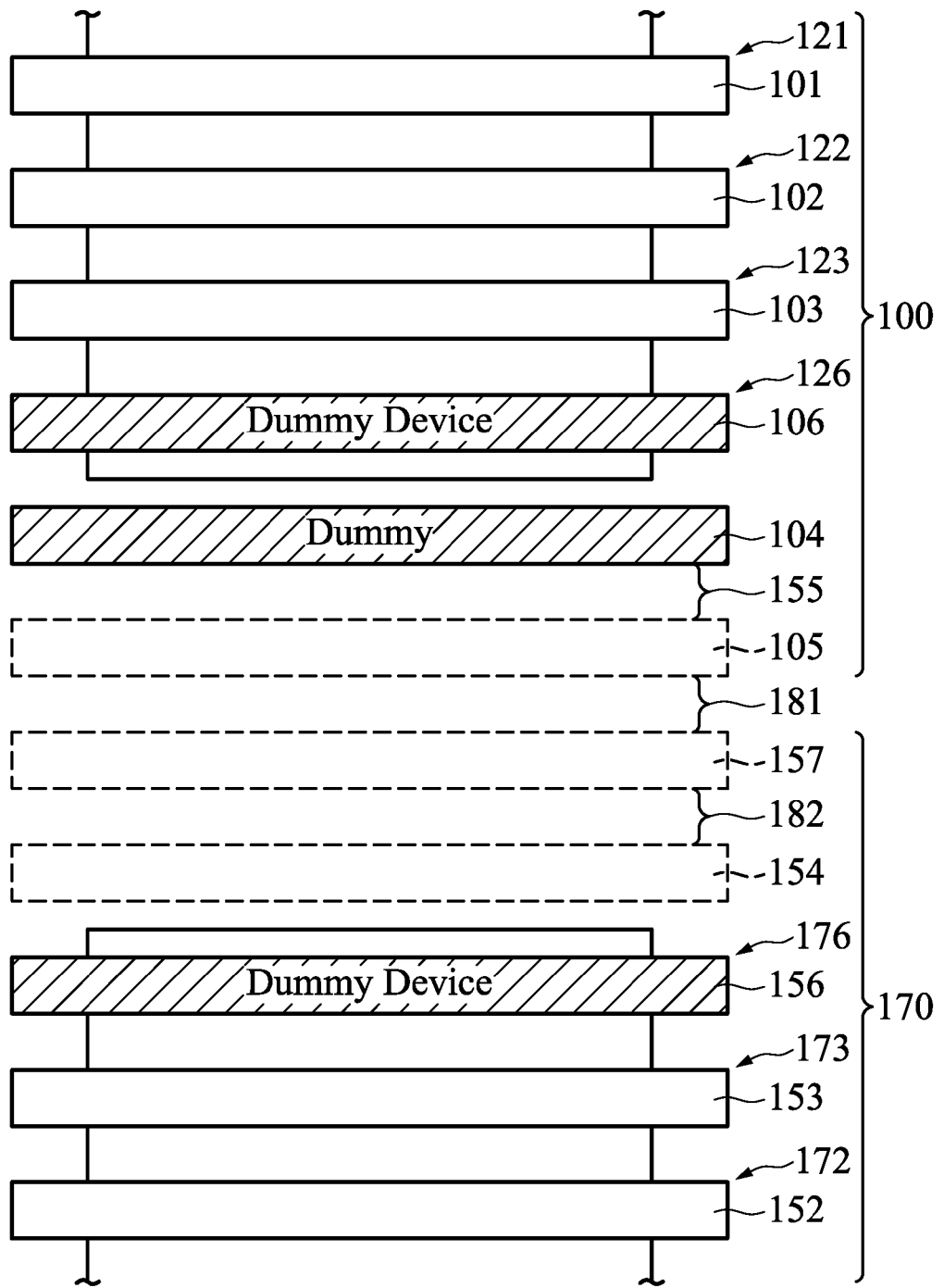

FIG. 1G shows two device regions 100 and 170, in accordance with some embodiments. Device region 100 has been described above. Device region 170 is similar to device region 100, with transistor 173 being a transistor at the edge of an area of devices, including transistors 172, and 173. Transistor 173 has a gate structure 153. To resolve the LOD and edge effect issues related to edge transistor 173, a dummy device 176 is placed next to transistor 173. Dummy device 176 has a gate structure (polysilicon) 156. To follow the design rule of two dummy polysilicon structures placed next to an edge gate structure, device region 170 also includes dummy polysilicon structures 154 and 157, placed next to gate structure 156. As described above, since the gate structures 106 and 156 of dummy devices 126 and 176 can be considered as dummy polysilicon structures, dummy polysilicon structures 105 and 157 are not needed and the spaces 155 and 181 between these dummy structures and neighboring dummy polysilicon structure 104 that would have been needed according to the existing design rules could have been saved.

A further application of the concept can be seen in FIG. 1G. If device regions 100 and 170 are placed next to each other, only one dummy polysilicon structure, such as structure 104, is needed between dummy gate structures 106 and 156 of dummy devices 126 and 176. Dummy structure 104 can be used as a dummy structure for edge device 173. Therefore, dummy structure 154 and space 182 are not needed and space can be saved.

For advanced technologies, more devices are needed to perform more tasks in a single chip and the real estate on the chip is very valuable. By treating gate polysilicon structures of dummy devices as dummy polysilicon structures placed next to edge devices to resolve processing and device concerns, precious space on chips can be saved.

Figure 2A:
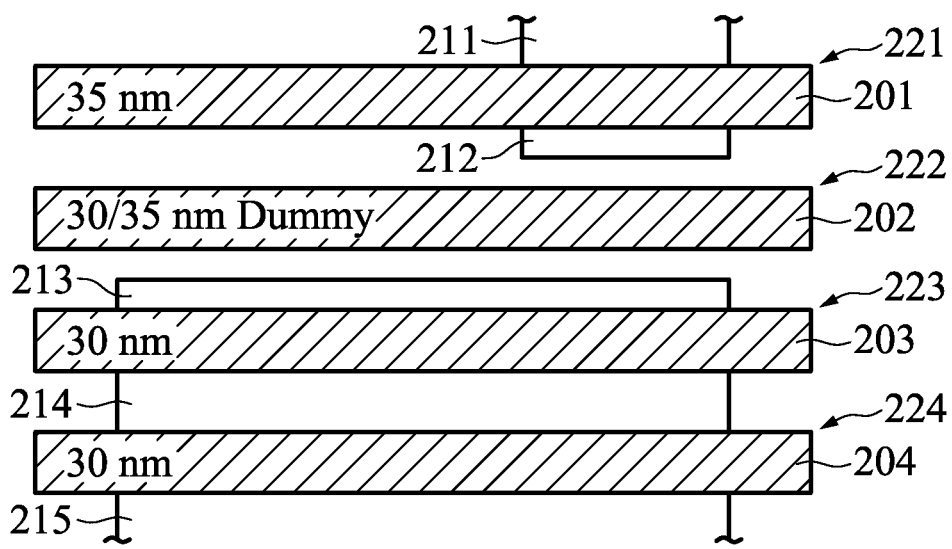
FIGS. 2A-2D show different embodiments of design layout of neighboring devices with different gate lengths.

Another design rule is related to diffusion regions (or implant regions). The design rule specifies that transistors with different gate lengths (or widths) cannot share diffusion regions. FIG. 2A shows a top layout view of a device area 200, in accordance with some embodiments. FIG. 2A shows a transistor 221 with a polysilicon structure 201 with a gate length "L" of 35 nm. The polysilicon structure 201 is placed between a diffusion region 211 and another diffusion region 212. FIG. 2A also shows a transistor 223 near transistor 221. The transistor 223 has a polysilicon structure 203 with a gate length of 30 nm. The polysilicon structure 203 is placed between a diffusion region 213 and another diffusion region 214. The design rules specify that gate structures with different gate lengths (30 nm for gate poly 203 and 35 nm for gate poly 201) cannot be place next to each other. If transistors with different gate lengths are placed next to each other, during the lithography process, the gate lengths of these two neighboring gate structures might not yield the desired respective values (30 nm and 35 nm respectively). By placing a dummy polysilicon structure between these two gate structures with different lengths, more accurate dimensions of these two gate structures can be achieved.

Due to the requirement of separation, a dummy polysilicon structure 202 is placed between polysilicon structure 201 and polysilicon structure 203. The dummy polysilicon structure 202 has a length of 35 nm or 30 nm, in accordance with some embodiments. After patterning process, the gate length of dummy polysilicon structure 202 might not be at the target value. However, with the insertion of the dummy polysilicon structure 202, the lengths of gate poly 201 and gate poly 203 would more likely to be at their respective target values.

Figure 2B:
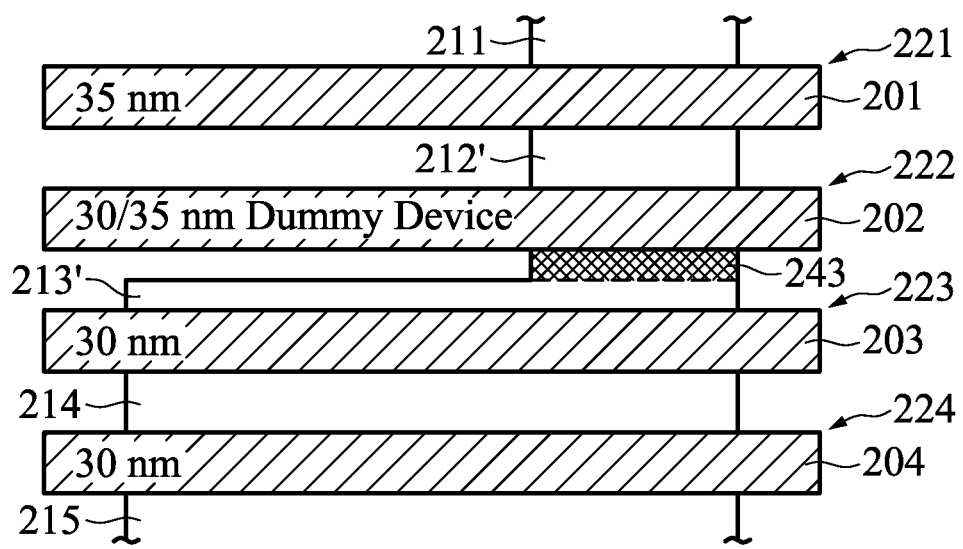

As described above in FIGS. 1A and 1B, edge diffusion regions, such as region 114 has LOD and edge effect issues. Similarly, diffusion regions 212 and 213 also have LOD and edge effect issues. To resolve or reduce such issues, polysilicon structure 202 can be turned into a gate structure and become part of a dummy device 222, as shown in FIG. 2B (layout 220) in accordance with some embodiments. As mentioned above, since device 222 is a dummy device, it would be tied to either to Vdd or Vss depending on whether it's an NMOS or a PMOS. Device 222 is formed by extending the diffusion region 212 all the way to polysilicon structure 202 to become region 212'. Diffusion region 213 is changed to diffusion region 213' to allow a new diffusion region 243 to be next to polysilicon structure 202. By expanding the diffusion region 212 to become diffusion region 212', the LOD and edge effect issues related to diffusion region 212 (or transistor 201) are resolved. However, the LOD and edge effect issues for diffusion region 213 (or transistor 223) are not completely resolved.

Figure 2C:
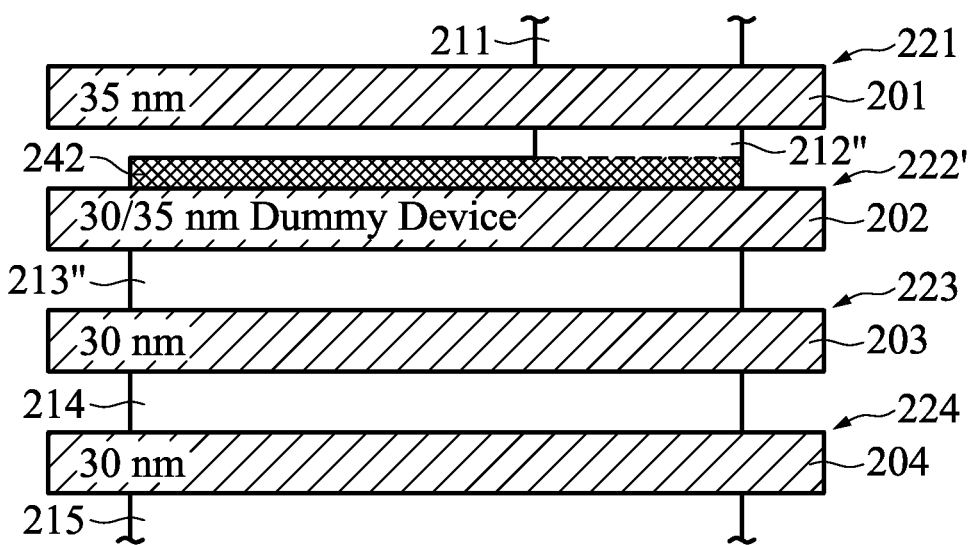

FIG. 2C shows another layout design 240 that can resolve LOD and edge effect issues for diffusion region 213, in accordance with some embodiments. In the layout design 240 shown in FIG. 2C, the diffusion region 213" next to transistor 223 is extended completely to the edge of polysilicon structure 202; therefore, the LOD and edge effect issues related to diffusion region 213" are resolved. However, the diffusion region 212" has an extra diffusion region 242 in comparison to diffusion region 212. The extra diffusion region 242 could impact the device performance for transistor 221. Whether to choose design (or layout) 220 or 240 depends on which device (transistor 221 or 223) is more important. If the performance of transistor 221 is more important, design 220 should be chosen. On the other hand, if the performance of transistor 223 is more important, design 240 should be chosen. Since transistor 222 is a dummy device, its performance is not important; modifying the design rule to allow a diffusion region to be shared with diffusion region(s) of a dummy device with a different width should not affect the device performance. In some embodiments, the width of polysilicon structure 202 of dummy device 222 is drawn at 30 nm or 35 nm.

Figure 2D:
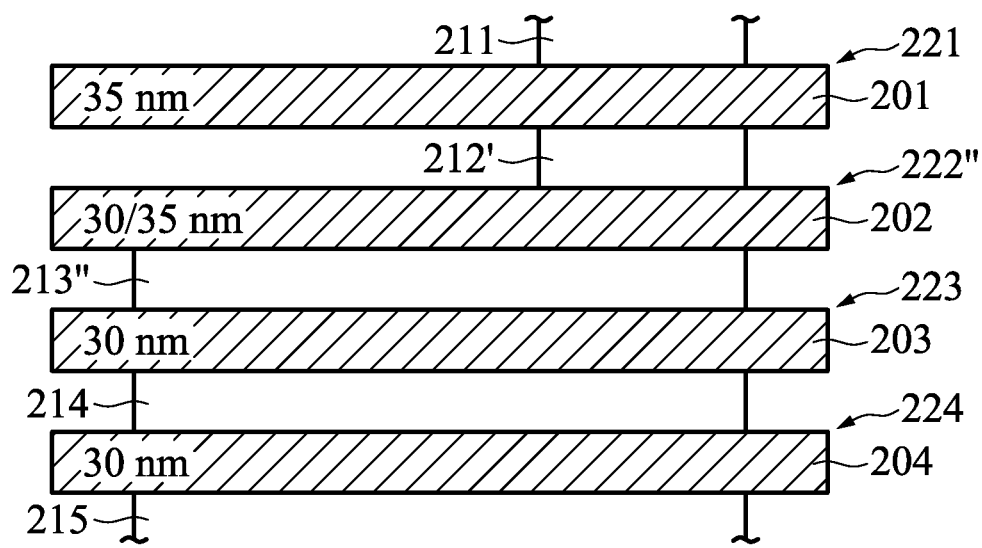

As mentioned above, transistor 222 is a dummy device and its performance is not important. Another option of resolving LOD and edge effect issues for transistors 221 and 223 (or diffusion regions 212 and 213) is shown in FIG. 2D, in accordance with some embodiments. FIG. 2D shows that diffusion region 212 of FIG. 2A is extended to become region 212' and diffusion 213 of FIG. 2A is extended to become 213". Both regions 212' and 213" maintain the length of diffusion regions of the original design. As a result, both transistors 221 and 223 have LOD and edge effect issues of their respective diffusion regions 212 and 213 resolved.

Figure 3A:
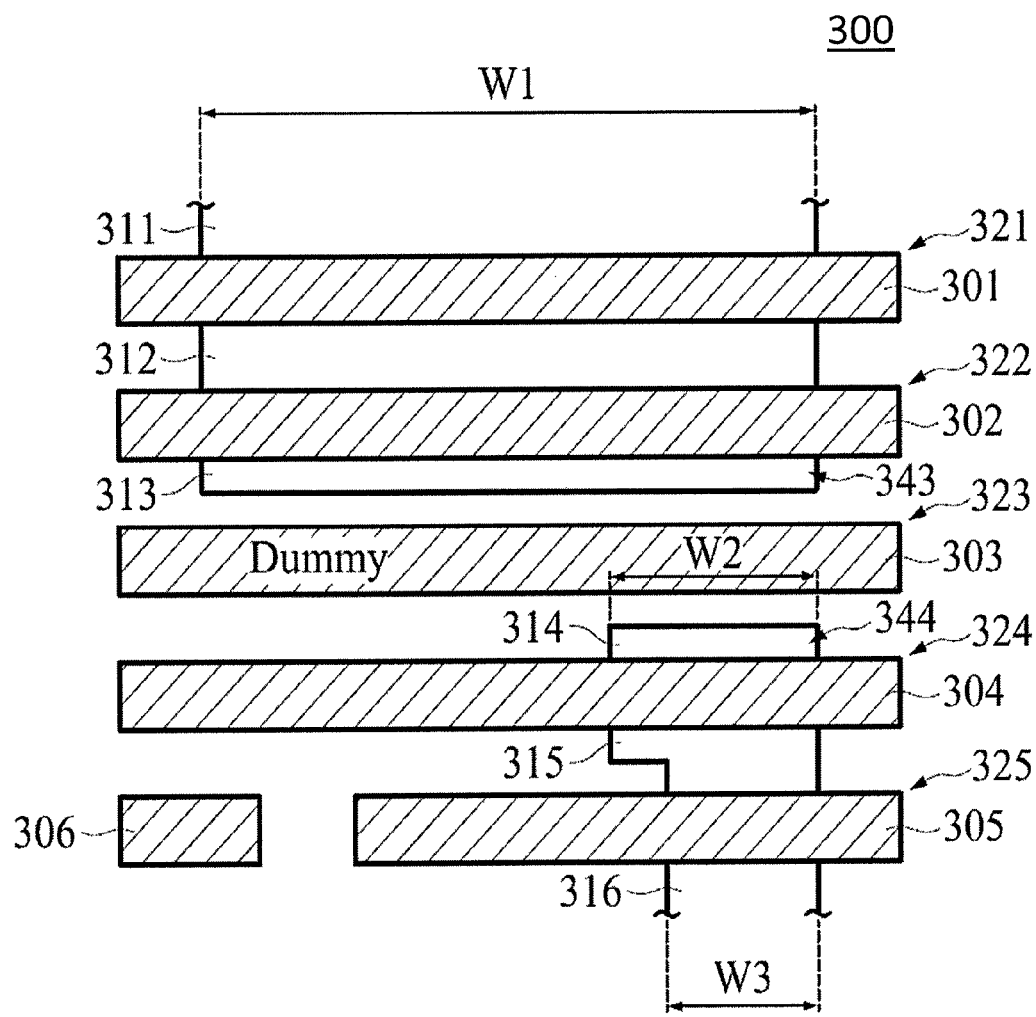
FIGS. 3A-3D show different embodiments of a device with an irregular-shaped diffusion region near a device with different gate width.

Another design rule is related to restriction on shapes of diffusion regions (or implant regions). The design rule specifies that in shared diffusion regions of devices cannot have more than one shared diffusion region that has an irregular shape (or L shape, or non-rectangular shape, or odd shape). FIG. 3A shows a top layout view of a device area 300, in accordance with some embodiments. Device area 300 includes transistors 321, 322, 324, and 325. Transistors 321 and 322 are made of gate structures 301 and 302 respectively, and include diffusion regions 311, 312 and 313 on either side of transistors 321 and 322 respectively. Transistors 324 and 325 are made of gate structures 304 and 305 respectively, and include diffusion regions 314, 315 and 316 on either side of transistors 324 and 325 respectively. The width of the diffusion regions 311, 312, and 313 is "$W_1$", which is different from the widths of diffusion regions 314 ($W_2$) and 316 ($W_3$). The width of diffusion region 315 is hard to define due to the odd shape (or L shape) of the diffusion region. The shape of diffusion region 315 is allowed according to the design rule. However, the design rule allows only one such region in a device region, such as the region with transistors 324 and 325, with shared diffusion regions, such as diffusion regions 314, 315, and 316. Irregular shaped diffusion region, such as diffusion region 315, makes device simulation difficult and hard to match the real performance of the devices, including devices 324 and 325. However, a single "L" shaped diffusion region is considered manageable and allowed according to the design rules. Although an "L" shaped (or irregular shaped) diffusion region is allowed, the design rule specifies that another irregular shaped diffusion region in the same device region is not allowed. As a result, diffusion region 314 is separated from diffusion region 313 by a dummy gate structure 303.

Figure 3B:
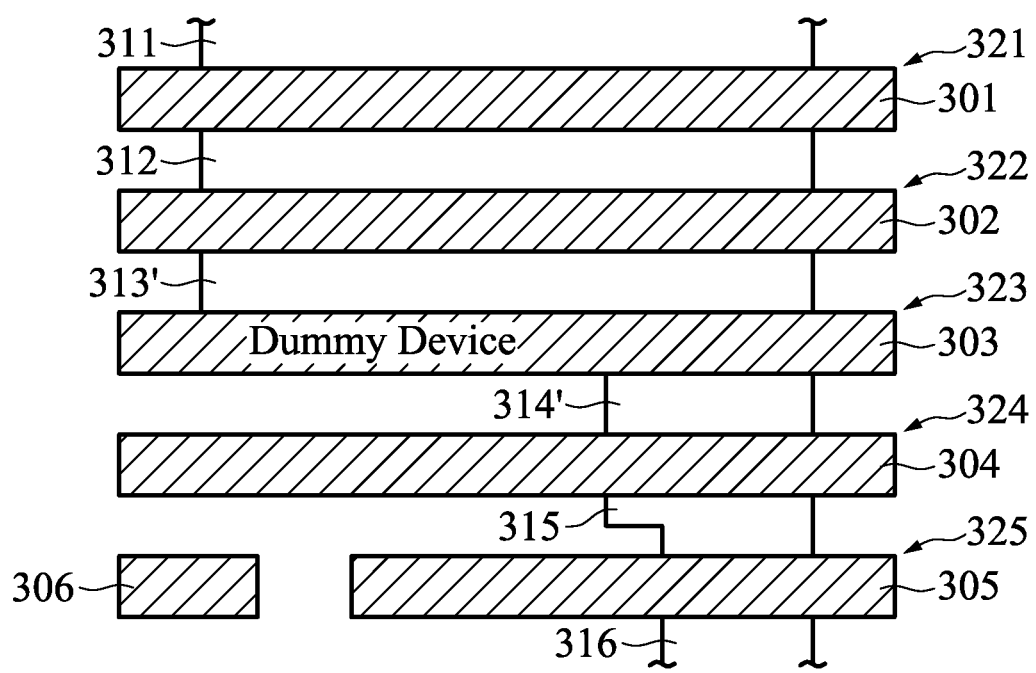

As mentioned above, there are LOD and edge effect issues associated with diffusion regions, such as region 313 and 314, which are shortened and have long edges, 343 and 344 respectively. The issues can be solved (or reduced) by turning dummy structure 303 into a dummy device 323 and extending the diffusion regions 313 and 314 to each side of dummy gate structure 303. The extended diffusion regions 313 and 314 would become regions 313' and 314', as shown in FIG. 3B, in accordance with some embodiments. Since dummy transistor 323 is not important, the different widths of diffusion regions 313' and 314' are of no concern. However, with the creation of dummy device 323, the extended diffusion regions 313' and 314' resolve the LOD and edge effect concerns (or issues) of transistor 322 and 324. The way to extend diffusion regions 313 and 314 to diffusion regions 313' and 314' is only an example. Other ways of extending the diffusion regions, such as the ones shown in FIGS. 2B and 2C to focus on the performance of one of the two transistors next to the dummy device 323, are also possible. As noted above, the gate of dummy device 323 needs to be inactivated by being tied to Vdd or Vss, depending on the type of device 323.

Figure 3C:
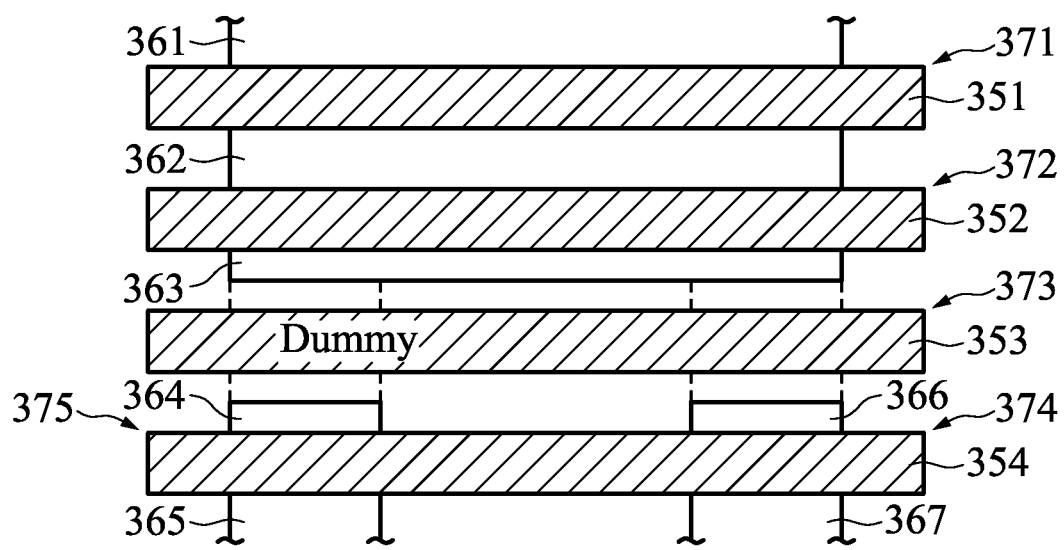
Figure 3D:
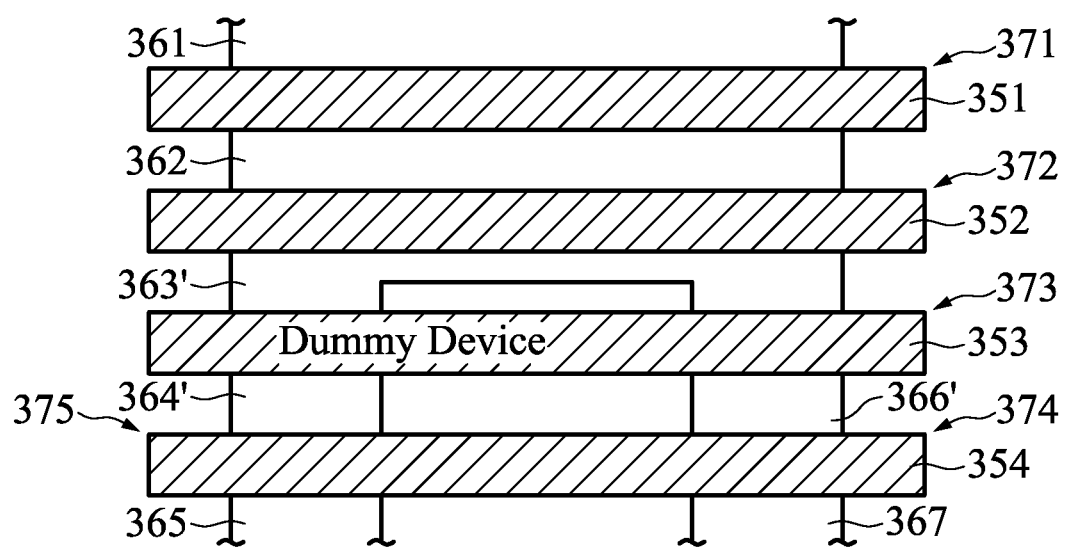

FIG. 3C shows another example of placing a dummy structure 353 between devices 372, 374, and 375, in accordance with some embodiments. If the diffusion region 364 of device 375 and device region 366 of device 374 are extended to diffusion region 363 (see dotted lines in FIG. 3C), the diffusion region 363* would become "U" shaped, which is considered an irregular shape (not a rectangular shape, or with a single L shape) according to the design rule. As mentioned above, the devices involving diffusion regions 363, 364, and 366 would suffer from LOD and edge effect issues. In order to resolve such issues, the dummy polysilicon structure 353 can be turned into a dummy device 373 with the diffusion regions 363, 364, and 366 becoming diffusion regions 363', 364', and 366'. Since device 373 is a dummy device, its performance is not important. As a result, the design rule can be modified to allow irregular shaped diffusion region next to a dummy device. The embodiment shown in FIG. 3D is merely an example. Other embodiments are also possible. For example, the diffusion region 363' could extend all the way to the dummy gate structure 353 of the dummy device 373 in its entire width (similar to the region 313' of FIG. 3B).

Figure 4A:
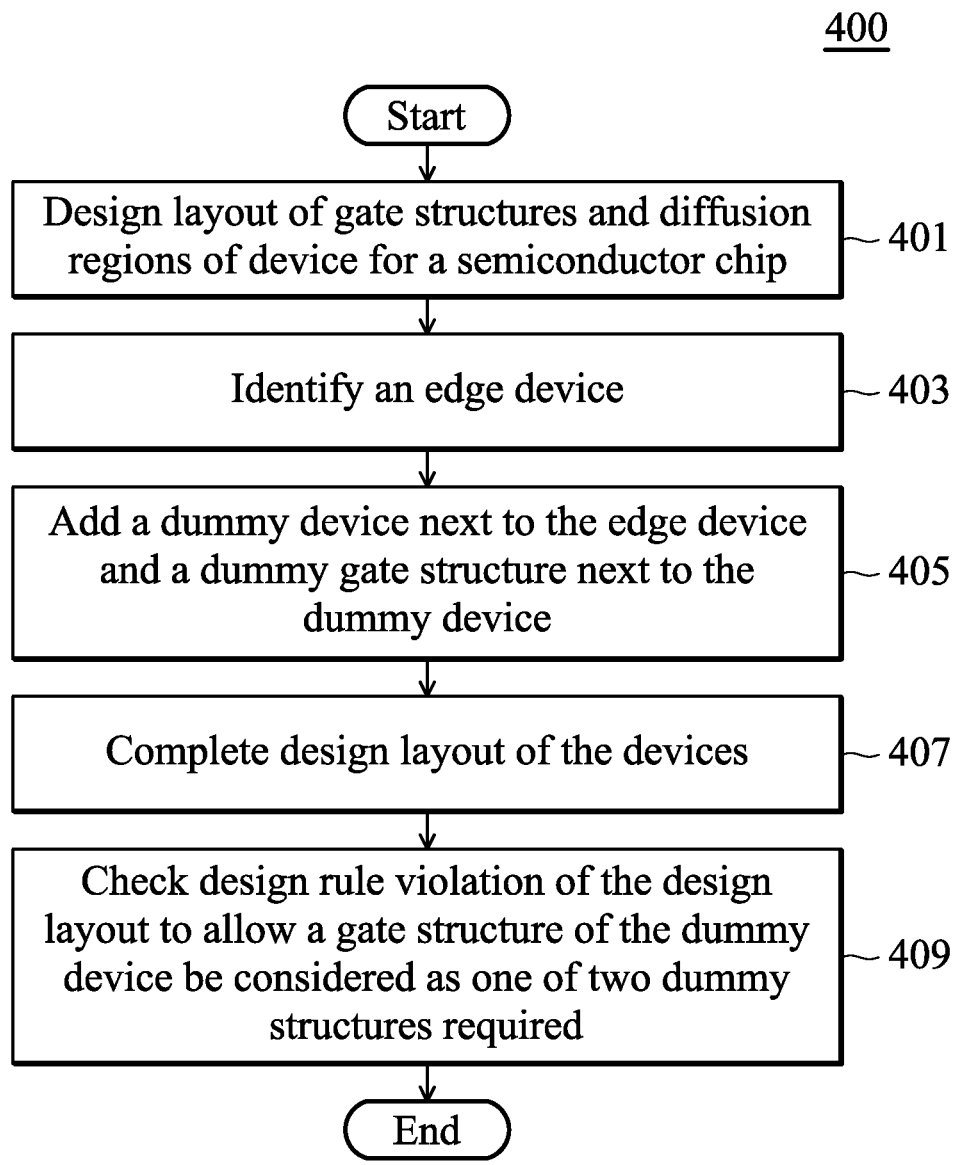
FIGS. 4A-4C various process flows of designing and verifying a design layout, in accordance with some embodiments.

FIG. 4A shows a process flow 400 of designing and verifying a design layout, in accordance with some embodiments. At operation 401, layout of gate structures and diffusion regions of devices for a semiconductor chip is designed. At operation 403, an edge device is identified. At operation 405, a dummy device is added next to the edge device and a dummy gate structure (such as a dummy polysilicon line) is added next to the dummy device. The dummy device shares a diffusion region with the edge device; therefore, the LOD and edge effect issue for the edge device are resolved or reduced. At operation 407, the design layout of the devices is completed. After the design layout is completed, a design rule check is conducted to make sure all design rules are followed. At operation 409, design rule violation is checked against the design layout and the design rule allows a gate structure of the dummy device be considered as a dummy gate structure. Examples of layouts and structures are shown in FIGS. 1A-1G, in accordance with some embodiments.

Figure 4B:
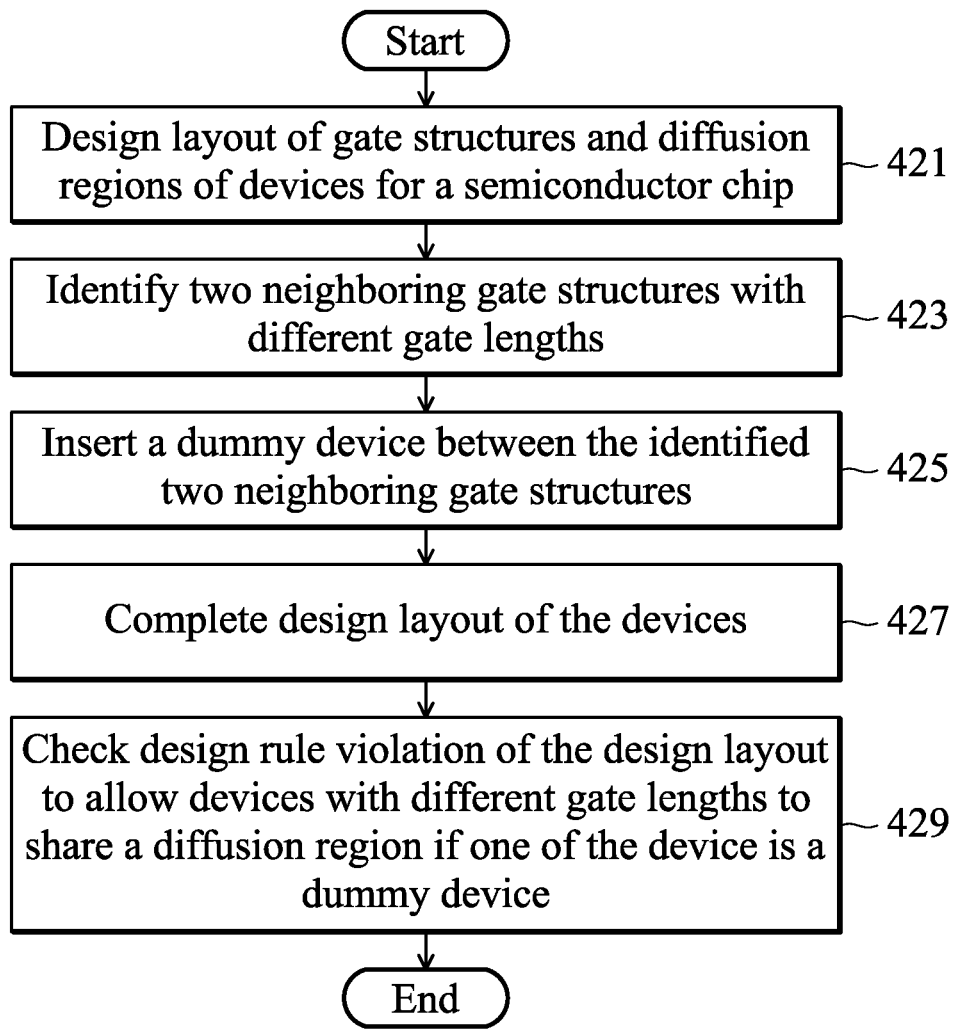

FIG. 4B shows a process flow 420 of designing and verifying a design layout, in accordance with some embodiments. At operation 421, layout of gate structures and diffusion regions of devices for a semiconductor chip is designed. At operation 423, two neighboring gate structures with different gate lengths are identified. At operation 425, a dummy device is inserted between the two identified gate structures. The dummy device shares diffusion regions with devices of the two identified gate structures; therefore, the LOD and edge effect issues for the two devices with different gate widths are resolved or reduced. The gate width of the dummy device is the same as one of the two devices with different gate widths. At operation 427, the design layout of the devices is completed. After the design layout is completed, a design rule check is conducted to make sure all design rules are followed. At operation 429, design rule violation is checked against the design layout and the design rule allows the dummy device to share a diffusion region with a neighboring gate structure that has a different gate length. Examples of layouts and structures are shown in FIGS. 2A-2D, in accordance with some embodiments.

Figure 4C:
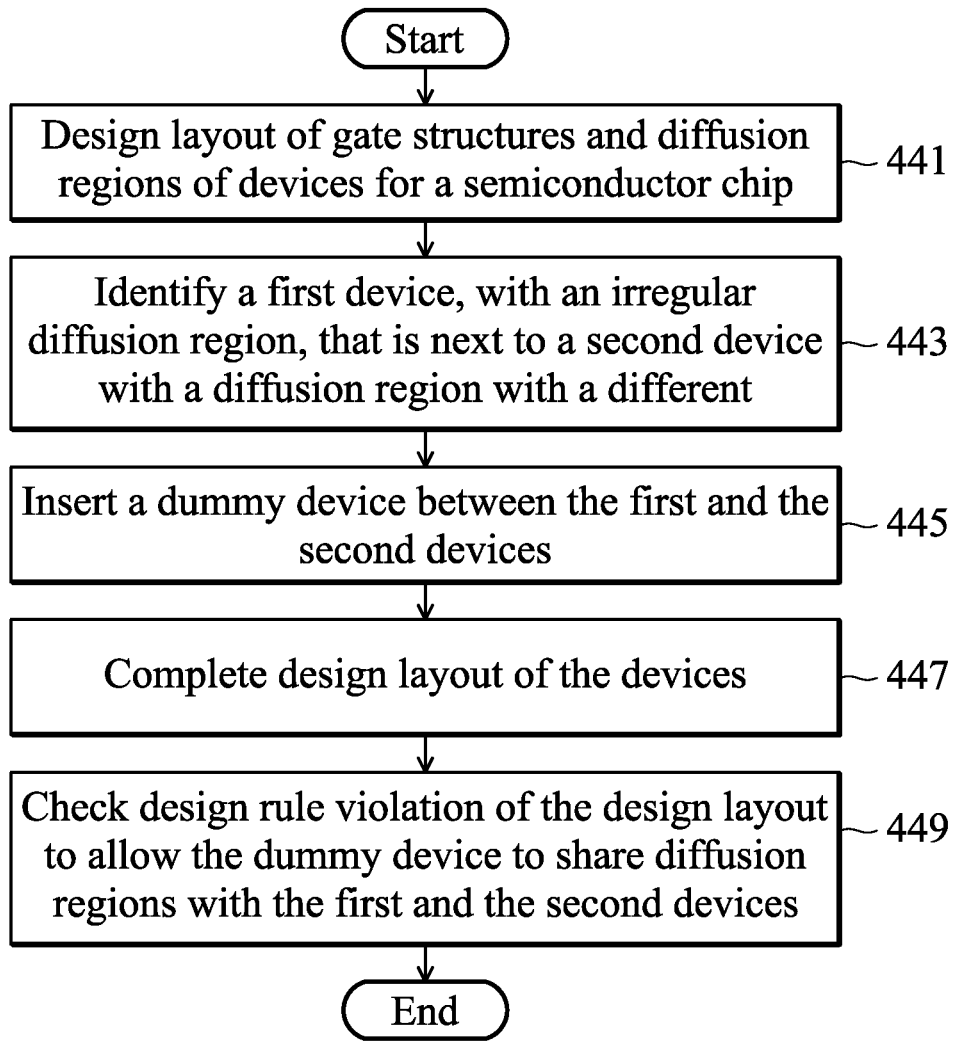

FIG. 4C shows a process flow 440 of designing and verifying a design layout, in accordance with some embodiments. At operation 441, layout of gate structures and diffusion regions of devices for a semiconductor chip is designed. At operation 443, a first device with an irregular diffusion region (or non-rectangular or L shaped region) and the first device being next to a second device with a different diffusion width is identified. At operation 445, a dummy device is inserted between the first and the second devices. The dummy device shares diffusion regions with the first and the second devices; therefore, the LOD and edge effect issues for the first and the second devices are resolved or reduced. At operation 447, the design layout of the devices is completed. After the design layout is completed, a design rule check is conducted to make sure all design rules are followed. At operation 449, design rule violation is checked against the design layout. The design rule allows the dummy device to share diffusion regions with the first and the second devices. Examples of layouts and structures are shown in FIGS. 3A-3D, in accordance with some embodiments.

The layouts, device structures, and methods described above utilize dummy devices to extend the diffusion regions of edge structures and/or non-allowed structures to the dummy device. Such extension of diffusion regions resolves or reduces LOD and edge effect issues. In addition, treating the gate structure of a dummy device next to an edge device also allows only one dummy structure to be added next to the dummy device and saves real estate on the semiconductor chip. The dummy devices are deactivated and their performance is not important. Therefore, utilizing dummy devices to extend the diffusion regions of edge structures and/or non-allowed structures according to design rules allows the resolution or reduction or LOD and edge effect issues without the penalty of yield reduction or increase in layout areas. In some embodiments, the gate lengths of the devices described above are less than 40 nm. In some other embodiments, the gate lengths of the devices described above are less than 35 nm.

In one embodiment, a device region on a substrate is provided. The device region includes an edge device, and the edge device has at least one useful device on one side. The device region also includes a dummy device next to the edge device. The dummy device is on the opposite side of the edge device from the at least one useful device. The dummy device shares a diffusion region with the edge device to reduce length of diffusion (LOD) and edge effect issues of the edge device. The device region further includes a dummy gate structure next to the dummy device. The dummy gate structure and a gate structure of the dummy device are needed to comply with the design rule for the edge device.

In another embodiment, a device region on a substrate is provided. The device region includes a first device with a first gate length, and a second device with a second gate length. The second gate length is different from the first gate length. The device region also includes a dummy device between the first device and the second device. There is no other device between the first device and the dummy device and also between the second device and the dummy device. The dummy device shares a first diffusion region with the first device and a second diffusion region with the second device to reduce length of diffusion (LOD) and edge effect issues of the first and the second devices.

In another embodiment, a device region on a substrate is provided. The device region includes a first device with a non-rectangular diffusion region on one side, and a second device with a width of a diffusion region near the first device. The width of the diffusion region of the second device does not equal to one or more widths of the non-rectangular diffusion region of the first device. The device region also includes a dummy device between the first device and the second device. There is no other device between the first device and the dummy device and also between the second device and the dummy device. The dummy device shares the non-rectangular diffusion region with the first device and the diffusion region of the second device near the first device to reduce length of diffusion (LOD) and edge effect issues of the first and second devices.

In yet another embodiment, a method of designing a layout of devices is provided. The method includes designing layout of gate structures and diffusion regions of devices, and identifying an edge device. The method also includes adding a dummy device next to the edge device and a dummy gate structure next to the dummy device. The dummy device shares a diffusion region with the edge device to reduce length of diffusion (LOD) and edge effect issues of the first and second devices. A gate structure of the dummy device is considered to be one of the two dummy gate structures next to the edge device needed to meet a design rule requirement.

Various modifications, changes, and variations apparent to those of skill in the art may be made in the arrangement, operation, and details of the methods and systems disclosed. Although the foregoing disclosure has been described in some detail for purposes of clarity of understanding, it will be apparent that certain changes and modifications may be practiced within the scope of the disclosure. Accordingly, the present embodiments are to be considered as illustrative and not restrictive, and the disclosure is not to be limited to the details given herein, but may be modified within the scope and equivalents of the disclosure.

What is claimed is:

1. A device region on a substrate, comprising:
an edge device, wherein the edge device has at least one device on one side;
a dummy device next to the edge device, wherein the dummy device is on the opposite side of the edge device from the at least one device, and wherein the dummy device shares a first diffusion region with the edge device and a second diffusion region is formed at an opposite side of the dummy device; and
a dummy gate structure next to the dummy device, wherein the dummy device is between the dummy gate structure and the edge device, and the dummy gate structure does not overlap the second diffusion region.

2. The device region of claim 1, wherein the edge device and the dummy device are NMOS (N-type metal-oxide-semiconductor) devices.

3. The device region of claim 2, wherein the gate structure of the dummy device is tied to Vss to deactivate the dummy device.

4. The device region of claim 1, wherein the edge device and the dummy device are PMOS (P-type metal-oxide-semiconductor) devices.

5. The device region of claim 4, wherein the gate structure of the dummy device is tied to Vdd to deactivate the dummy device.

6. The device region of claim 1, wherein a gate length of at least one of the edge device, the dummy device and the at least one device is less than 35 nm.

7. The device region of claim 1, wherein a gate structure of the dummy gate is considered as a dummy gate structure according to a design rule.

8. A device region on a substrate, comprising:
a first device with a first gate length;
a second device with a second gate length, wherein the second gate length is different from the first gate length; and
a dummy device between the first device and the second device, wherein there is no other device between the first device and the dummy device and no other device between the second device and the dummy device, wherein the dummy device shares a first diffusion region with the first device and a second diffusion region with the second device, wherein a gate length of the dummy device is longer than at least one of a gate length of the first device or a gate length of the second device.

9. The device region of claim 8, wherein the first device, the second device, and the dummy device are all NMOS (N-type metal-oxide-semiconductor) devices.

10. The device region of claim 9, wherein a gate structure of the dummy device is tied to Vss to deactivate the dummy device.

11. The device region of claim 8, wherein the first device, the second device, and the dummy device are all PMOS (P-type metal-oxide-semiconductor) devices.

12. The device region of claim 11, wherein a gate structure of the dummy device is tied to Vdd to deactivate the dummy device.

13. The device region of claim 8, wherein a gate length of the first device and a gate length of the second device are less than 35 nm.

14. A device region on a substrate, comprising:
a first device with a non-rectangular diffusion region on one side;
a second device with a diffusion region near the first device, wherein a width of the diffusion region of the second device does not equal one and more widths of the non-rectangular diffusion region of the first device; and
a dummy device between the first device and the second device, wherein there is no other device between the first device and the dummy device and no other device between the second device and the dummy device, wherein the dummy device shares the non-rectangular diffusion region with the first device and the diffusion region of the second device near the first device.

15. The device region of claim 14, wherein the first device, the second device, and the dummy device are all NMOS (N-type metal-oxide-semiconductor) devices.

16. The device region of claim 15, wherein a gate structure of the dummy device is tied to Vss to deactivate the dummy device.

17. The device region of claim 14, wherein the first device, the second device, and the dummy device are PMOS (P-type metal-oxide-semiconductor) devices.

18. The device region of claim 17, wherein a gate structure of the dummy device is tied to Vdd to deactivate the dummy device.

19. The device region of claim 17, wherein a gate length of the first device and a gate length of the second device are less than 35 nm.

* * * * *